(12) United States Patent
Lind

(10) Patent No.: US 6,632,056 B1
(45) Date of Patent: Oct. 14, 2003

(54) FIXING ELEMENT FOR DOUBLE GLASS PLATES

(75) Inventor: Stefan Lind, Waldachtal (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/048,200

(22) PCT Filed: Jul. 14, 2000

(86) PCT No.: PCT/EP00/06717

§ 371 (c)(1),
(2), (4) Date: Apr. 17, 2002

(87) PCT Pub. No.: WO01/09459

PCT Pub. Date: Feb. 8, 2001

(30) Foreign Application Priority Data

Jul. 29, 1999 (DE) ..................................... 299 13 278 U

(51) Int. Cl.[7] .............................................. F16B 39/00
(52) U.S. Cl. ...................... 411/107; 411/183; 411/501; 403/282; 403/331; 403/375
(58) Field of Search ................................. 411/107, 501, 411/502, 183, 546; 403/274, 279, 282, 331, 375, 376

(56) References Cited

U.S. PATENT DOCUMENTS

| 695,265 | A | * | 3/1902 | Bartel | 411/501 |
|---|---|---|---|---|---|
| 2,995,821 | A | * | 8/1961 | Gordon | 30/344 |
| 3,083,796 | A | * | 4/1963 | Bell, Jr. | 403/388 |
| 3,745,613 | A | * | 7/1973 | Daddona, Jr. | 24/94 |
| 5,106,250 | A | * | 4/1992 | Fischer et al. | 411/107 |
| 5,531,535 | A | * | 7/1996 | Lind | 403/297 |
| 5,733,086 | A | * | 3/1998 | Jakob | 411/501 |

FOREIGN PATENT DOCUMENTS

| DE | 40 11 229 A | 8/1991 |
|---|---|---|
| DE | 197 51 124 C | 4/1999 |
| EP | 0 439 706 A | 8/1991 |
| EP | 0 647 760 A | 4/1995 |

* cited by examiner

Primary Examiner—Flemming Saether
Assistant Examiner—Jori Schiffman
(74) Attorney, Agent, or Firm—Michael J. Striker

(57) ABSTRACT

A fastening element for doubleglass panels has a threaded bolt having a forward end and provided with an expansion cone at the forward end, an annular expansion element pushed onto the expansion cone for expansion in a hole drilled in a rear glass panel and provided with an undercut in a region of a bottom of the drilled hole, a cap placed on the expansion element and resting against an end face of the threaded bolt, and a spacing sleeve arranged on a shank of the threaded bolt so as to rest against the rear glass panel and to pass through a front glass panel, the spacing sleeve having a portion engageable in the hole drilled in the rear glass panel and providing an abutment for the expansion element.

3 Claims, 1 Drawing Sheet

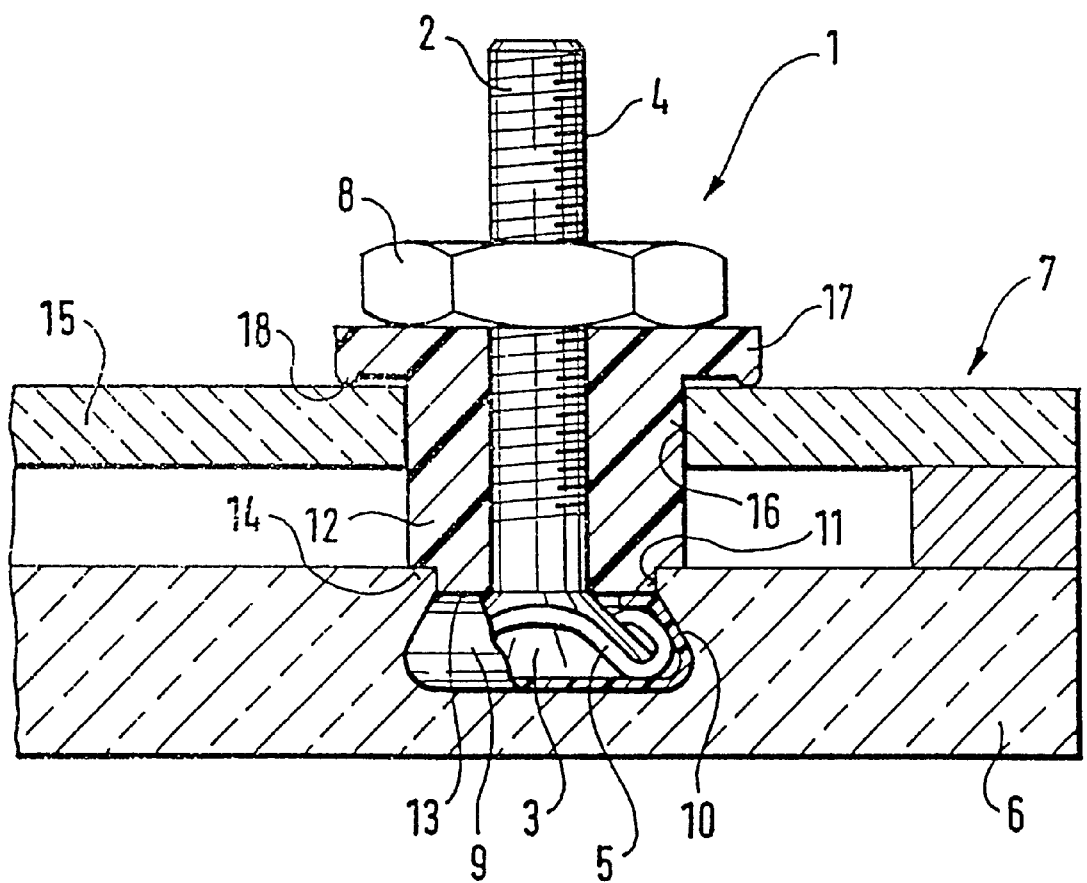

FIXING ELEMENT FOR DOUBLE GLASS PLATES

BACKGROUND OF THE INVENTION

The Invention relates to a fastening element for double glass panels.

DE 40 11 229 discloses a fastening element for anchoring in a facing panel, which fastening element consists of a threaded bolt having an expansion cone arranged at its forward end, onto which expansion cone there can be pushed an annular expansion element. In order to prevent the fastening element from coming out of the drilled hole when it is being anchored in the thin-walled facing panels, anchoring takes place in an undercut drilled hole, allowing high pull-out loads whilst the anchoring is virtually free of pressure of expansion.

In order to centre the threaded bolt in the drilled hole, a spacing element is provided, which at the same time ensures that the expansion element pushed onto the expansion cone is not displaced. The spacing element has a flange, which rests against the external surface of the facing panel, as a result of which the fastening element is tensioned when a nut is screwed up on the threaded bolt; the tensioning provides support for the fastening element so that transverse forces are taken up.

Because of the high tensioning force required to provide support for the fastening element, on the one hand, and because the expansion element, which is made from metal, bears directly against the wall of the drilled hole, on the other hand, the known fastening element is not suitable for fastening double glass panels, for example for cladding buildings.

SUMMARY OF THE INVENTION

The invention is accordingly based on the problem of providing a fastening element that is suitable for anchoring in glass panels and for the fastening thereof.

When the fastening element is designed in accordance with the present invention, it eliminates the above mentioned problem.

By means of the cap, which is made from soft plastics material and which is placed over the end face of the threaded bolt and the expansion element, direct contact between the expansion element, which is made from steel, and the glass surface is avoided. The cap, which is, for example, made from polyurethane, is resiliently and/or plastically deformable so that rigid loading at a point, which can in certain circumstances result in the glass breaking, is replaced by soft, irregularity-compensating loading over an area. Because of the resulting more uniform distribution of pressure over a larger area, high loading values can be achieved with the fastening element according to the invention, even in glass.

The portion engaging in the hole drilled in the rear glass panel and providing an abutment for the expansion element forms a shoulder on the spacing sleeve, which shoulder rests against the rear glass panel without exerting pressure. The spacing sleeve passes completely through the front glass panel so that, when the nut is screwed up for fixing the fastening element, the force of reaction is completely taken up by means of the spacing sleeve. Because there are no pressure forces acting on either the rear or the front glass panel when the fastening element is being anchored, the fastening element according to the invention is suitable for fastening double glass panels wherein the two panes are arranged spaced apart from one another. Because the spacing sleeve is given support by means of the portion engaging in the hole drilled in the rear glass panel and by its outer surface in the hole drilled in the front glass panel, the spacing sleeve also assumes the task of taking up transverse forces acting on the double glass panel.

In a further embodiment of the invention, the spacing sleeve can have a flange lapping over the hole drilled in the front glass panel. The spacing between the underside of the flange and the shoulder of the spacing sleeve resting against the rear glass panel is so selected that, when the fastening element is tightened, no pressure is exerted on the front pane of glass. The flange serves merely for additional sealing of the hole drilled in the front pane of glass and to extend the area for the nut to rest against. In order to improve sealing, one or more annular sealing ribs can be arranged on the underside of the flange. Such sealing, which can optionally be further improved using appropriate sealing means, is especially advantageous when the fastening element is used for fastening insulating glass panels.

BRIEF DESCRIPTION OF THE DRAWINGS

The invention is explained in greater detail hereinafter with reference to an exemplary embodiment illustrated in the drawing.

DESCRIPTION OF THE PREFERRED EMBODIMENTS

The fastening element 1 consists of a threaded bolt 2, which has an expansion cone 3 at its forward end and a thread 4 at its rear end. On the expansion cone 3 there is arranged an expansion element 5, which is pressed onto the expansion cone 3 for the purpose of anchoring the fastening element 1 in the rear glass panel 6 of a double glass panel 7. In the exemplary embodiment shown, the expansion element 5 is pressed on by screwing up the nut 8 on the threaded portion 4 of the threaded bolt 2. When the nut 8 is screwed up, the cap 9 of soft plastics material placed over the expansion element 5 and the end face of the threaded bolt 2 is compressed between the expansion element 5 and the wall of the undercut 10 of the drilled hole 11 so that direct contact between the expansion element 5, which is made from steel, and the glass surface is avoided.

The threaded bolt 2 passes completely through a spacing sleeve 12 of hard plastics material, a portion 13 of which engages in the hole 11 drilled in the rear glass panel 6. This portion 13, which has a smaller diameter than the spacing sleeve 12, forms a shoulder 14, by means of which the spacing sleeve 12 rests against the rear glass panel. The spacing sleeve 12 passes completely through the front glass panel 15, which has a drilled hole 16 corresponding to the external diameter of the spacing sleeve 12. For lapping over the hole 16 drilled in the front glass panel 15, there is arranged on the spacing sleeve 12 a flange 17, which on its underside is provided with an annular sealing rib 18 for improving the sealing. At the same time, the flange 17 serves as an abutment for the nut 8 in order to avoid direct contact with the glass panel 15. By means of the projecting end of the threaded bolt 2, the double glass panel 7 can be fastened to a substructure for the purpose of cladding a wall of a building (not illustrated).

What is claimed is:

1. A fastening element for doubleglass panels, comprising a threaded bolt having a forward end and provided with an expansion cone at said forward end; an annular expansion element pushed onto said expansion cone for expansion in a hole drilled in a rear glass panel and provided with an undercut in a region of a bottom of the drilled hole; a cap placed on said expansion element and resting against an end face of said threaded bolt; and a spacing sleeve arranged on a shank of said threaded bolt so as to rest against the rear glass panel and to pass through a front glass panel, said spacing sleeve having a portion engageable in the hole drilled in the rear glass panel and providing an abutment for said expansion element, wherein said cap and said spacing sleeve are composed of plastic materials such that a plastic material of said cap is softer than a plastic material of said spacing sleeve.

2. A fastening element as defined in claim 1, wherein said spacing sleeve has a flange operative for lapping over the hole drilled in the front glass panel.

3. A fastening element as defined in claim 2, wherein said flange has an underside provided with at least one annular sealing rib.

* * * * *